United States Patent [19]

Kiesewetter

[11] Patent Number: 4,747,136
[45] Date of Patent: May 24, 1988

[54] REST FOR THE RECEIVER OF AN AUTOMOBILE TELEPHONE

[75] Inventor: Reinhold Kiesewetter, Neufahrn, Fed. Rep. of Germany

[73] Assignee: Siemens Aktiengesellschaft, Berlin and Munich, Fed. Rep. of Germany

[21] Appl. No.: 798,307

[22] Filed: Nov. 15, 1985

[30] Foreign Application Priority Data

Nov. 29, 1984 [DE] Fed. Rep. of Germany ....... 3443645

[51] Int. Cl.⁴ .................. H04R 1/04; H04R 1/06; A47F 5/00; H04B 1/38
[52] U.S. Cl. ................. 377/455; 248/309.4; 379/86; 455/90
[58] Field of Search ........... 179/146 R, 159, 178, 179/101, 102, 103, 100 R; 381/86; 379/426, 435, 449, 454, 455, 424, 86; 455/89, 90; 248/309.1, 309.4

[56] References Cited

U.S. PATENT DOCUMENTS

| 4,472,606 | 9/1984 | Krolopp et al. ............ 379/455 |
| 4,581,490 | 4/1986 | Genender ..................... 379/424 |

FOREIGN PATENT DOCUMENTS

| 1214735 | 4/1966 | Fed. Rep. of Germany ...... 379/424 |
| 674754 | 11/1964 | Italy ........................ 179/146 R |
| 1144485 | 3/1969 | United Kingdom ............ 379/424 |

Primary Examiner—Jin F. Ng
Assistant Examiner—Danita R. Byrd
Attorney, Agent, or Firm—Hill, Van Santen, Steadman & Simpson

[57] ABSTRACT

A rest for a service receiver of an automobile telephone includes a plate-shaped lower part and a cap-shaped upper part having a depression therein for accepting the telephone trumpet portion of the service receiver. In an elevated region of the rest, two slot-shaped recesses and a pot-shaped portion lying therebelow are provided for mounting two retaining plates with a magnet disposed therebetween which magnetically engages a steel plate in the service receiver.

10 Claims, 1 Drawing Sheet

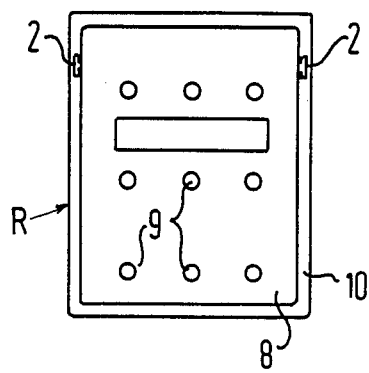
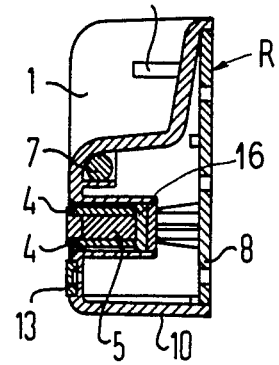
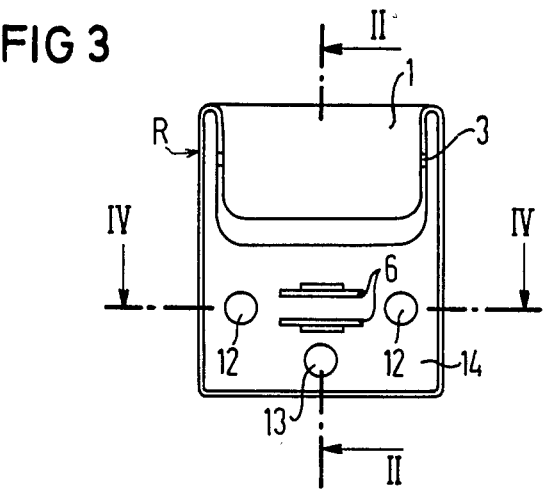
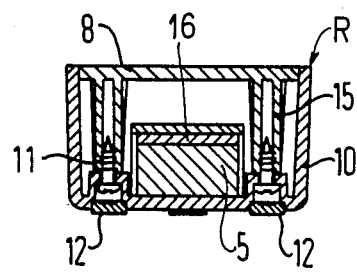

REST FOR THE RECEIVER OF AN AUTOMOBILE TELEPHONE

BACKGROUND OF THE INVENTION

1. Field of the Invention

The present invention relates to a rest for the receiver of an automobile telephone.

2. Description of the Prior Art

Early automobile telephones have an operating unit with the display and dial means and a separate handset. The operating unit is mounted either in dash or in a separate console in the passenger space. The handset for the automobile telephone requires an additional rest which considerably exceeds the dimensions of the handset. When the handset is picked up or placed down, a mechanical contact referred to as a cradle switch is opened or closed, respectively. Such cradle switch generally fixes the handset in position by a resilient latch support.

Due to the limited space available at the interior of a vehicle, it is important that automobile telephones be as small as possible. As such, service, or handsets, receivers of automobile telephones are now provided with display and dial elements and merely require a support mount for mating thereto.

SUMMARY OF THE INVENTION

An object of the present invention is to create a space-saving rest, or support mount, for an automobile telephone service receiver, or handset, incorporating all display and dial devices that is simple in structure. This and other objects are embodied in an automobile telephone rest for use in vehicles equipped with automobile telephones wherein the communication devices must be as small as possible due to the limited space available.

The present rest includes a plate-shaped lower part and a cap-shaped upper part which can be placed thereon. The upper part includes a shaped depression for accepting a telephone trumpet or earpiece, portion of the receiver and an elevated region having two slot-shaped recesses with a hollow formed-out portion disposed beneath the slot-shaped recesses. Two retaining plates having a magnet disposed therebetween project through the two slots in the upper side of the rest for magnetic engagement of a steel plate in the receiver and, thus, retain the receiver in position.

A simple, space-saving rest for an automobile telephone service receiver or handset in which all display and dial devices are contained is thus provided.

BRIEF DESCRIPTION OF THE DRAWINGS

FIG. 1 is a bottom plan view of the rest according to the principles of the present invention.

FIG. 2 is a longitudinal cross-section of the device of the present invention along line II—II of FIG. 3.

FIG. 3 is a plan view of the device according to the principles of the present invention.

FIG. 4 is a transverse cross section along line IV—IV of the device shown in FIG. 3.

DESCRIPTION OF THE PREFERRED EMBODIMENTS

A rest for a service receiver, or handset, of an automobile telephone (not shown) that contains all the required display and dial functions is shown generally at R in FIG. 1. The rest R has a cuboid shape and is formed of a plate-shaped lower part 8 and a cap-shaped upper part 10 which surrounds the lower part 8 at the edges thereof. The lower part 8 and the upper part 10 are connected to one another by screws 11 which are inserted into depressions in the upper part 10 and engage sleeve-shaped shoulders 15 of the lower part 8, as shown in FIG. 4.

The rest R is approximately one-third the size of the receiver which it holds. A depression 1 for accepting and holding the handset is at a first portion of the upper part 10 and is molded to the shape of the telephone earpiece portion of the service receiver. Wedges 2 composed of soft material which is preferably plastic are positioned in vertically disposed slots 3 of the upper part 10 in the region of the lateral seating of the service receiver within the depression 1.

A second elevated portion 14 of the cap-shaped upper part 10 is provided with two slot-shaped recesses 6 disposed parallel to one another with a pot-shaped formed-out portion situated therebelow. Two retaining plates 4 with a magnet 5 disposed therebetween are situated in this formed-out portion extending from the underside so that the plates 4 project through the two slots 6. A steel plate (not shown) is mounted in the receiver and the magnetic attraction between the steel plate and the retaining plates 4 retain the receiver in position.

To provide compensation for size variations and movement of the receiver, the retaining plates 4 are movably situated against flexible material 16 shown in FIGS. 2 and 4 in the rest R and thus enable the retaining plates 4 to engage in planar fashion the steel plate in the receiver. A cradle switch is formed by an additional magnet 7 disposed integrally within a cavity in the upper part 10 which actuates a reed relay mounted in a corresponding position in the service receiver or hand set. The magnet 7, which is preferably of a round shape, thus enables set up of calls, among other things. A second reed relay may be mounted within the receiver for operation by round magnet 7 by which the volume of incoming call signals can be controlled so that the volume can be at a maximum when the receiver is in the rest R and is automatically turned down when the receiver is picked up so that no painfully loud sounds are transmitted when the user is talking.

The plate-shaped lower part 8 includes a series of bores 9 by which the rest can be secured with screws to a mounting surface (not shown) in a vehicle. After the lower part 8 has been fastened to a vehicular surface, the upper part 10 of the rest is screwed to the lower part 8. The depressions in which the screws 11 are mounted in the upper part are subsequently closed by two cover caps 12 projecting above the elevated portion 14 of the rest R. A third cover cap 13 projects somewhat out of the portion 14 as well, which together with the cover caps 12 form an abutment for the receiver around the two magnet retaining plates 4 to prevent clattering thereof while driving. The cover caps 12 and 13 are preferably formed of a soft plastic material.

It is apparent from the foregoing specification, that the invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

I claim as my invention:

1. A rest for an automobile telephone receiver having an earpiece and a metal plate adjacent the earpiece, comprising:
- a substantially planar base plate including mounting holes;
- a generally cuboid shaped housing mounted over said base plate;
- means for fastening said housing to said base plate;
- said housing having a depression shaped to receive the earpiece of the automobile telephone receiver and having slots formed in said housing at opposing lateral portions of said depression;
- a wedge mounted in each of said slots for engagement with opposing lateral portions of the telephone earpiece;
- an elevated portion of said housing spaced from said depression and having a pair of openings; and
- a magnet mounted in said elevated portion including a pair or retaining plates extending through respective ones of said pair of openings for magnetic coupling with the metal plate of the telephone receiver;

whereby the earpiece of the telephone receiver is selectively receivable in the depression of said housing with the metal plate of the receiver magnetically engaged to said magnet through said pair of retaining plates.

2. A rest as claimed in claim 1, wherein: said retaining plates are movably mounted in said rest.

3. A rest as claimed in claim 1, wherein said wedges are of soft material.

4. A rest as claimed in claim 1, further comprising:
- screw-receiving sleeves on said base plate extending toward said housing, and
- screws connected between said housing and said base plate engaging said sleeves.

5. A rest as claimed in claim 4, wherein: said housing includes openings having said screws mounted in respective ones of said openings, and further comprising first cover caps mounted in said openings over said screws and projecting above the surface of said housing.

6. A rest as claimed in claim 5, further comprising: a second cover cap projecting above the surface of said housing.

7. A rest as claimed in claim 6, wherein: said first and second cover caps are formed of soft material.

8. A rest as claimed in claim 1, wherein: said base plate includes openings for fastening to a fastening surface in a vehicle.

9. A rest as claimed in claim 1, further comprising: a plurality of cover caps of soft plastic material mounted on said housing for engagement with the telephone receiver when the earpiece is received in said depression to prevent rattling of said receiver against said housing.

10. A rest as claimed in claim 1, wherein said automobile telephone receiver as a reed relay and, further comprising:
- a further magnet disposed within said housing in a position to magnetically actuate the reed relay of said automobile telephone receiver when the earpiece of the telephone receiver is received in the depression of said housing.

* * * * *